US006343147B2

United States Patent
Yamamoto

(10) Patent No.: US 6,343,147 B2
(45) Date of Patent: Jan. 29, 2002

(54) PRINT PREVIEW AND SETTING BACKGROUND COLOR IN ACCORDANCE WITH A GAMMA VALUE, COLOR TEMPERATURE AND ILLUMINATION TYPES

(75) Inventor: Nobuo Yamamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/962,643

(22) Filed: Nov. 3, 1997

(30) Foreign Application Priority Data

Nov. 5, 1996 (JP) ............................................. 8-292551

(51) Int. Cl.$^7$ ................................................. G06K 9/00
(52) U.S. Cl. ........................................ 382/167; 358/519
(58) Field of Search ................................ 382/162, 167, 382/274, 275, 312; 358/515, 516, 518, 519, 523, 461, 464, 520, 524; 345/150, 151, 153, 154, 199, 114, 589, 593, 600–605; 348/179, 182, 184, 189, 587, 602, 603, 655, 658

(56) References Cited

U.S. PATENT DOCUMENTS

| | | | | |
|---|---|---|---|---|
| 4,648,051 A | * | 3/1987 | Wandell et al. | 364/526 |
| 5,051,820 A | * | 9/1991 | Sasaki | 358/524 |
| 5,400,081 A | * | 3/1995 | Chaplin | 348/587 |
| 5,483,259 A | * | 1/1996 | Sachs | 345/153 |
| 5,638,117 A | * | 6/1997 | Engeldrum et al. | 348/179 |
| 5,739,928 A | * | 4/1998 | Scott | 358/520 |
| 5,986,718 A | * | 11/1999 | Barwacz et al. | 348/587 |

* cited by examiner

Primary Examiner—Timothy M. Johnson
(74) Attorney, Agent, or Firm—Fitzpatrick, Cella, Harper & Scinto

(57) ABSTRACT

When an image is displayed on a display device on the basis of image data, a blank region is formed around the image. A background color is displayed on the blank region. The background color to be displayed on the blank region is set so that its color temperature nearly matches that of a white paper sheet placed under desired illumination light. In this manner, the color tone of a preview image can be adjusted to match that of the original image with high precision.

7 Claims, 13 Drawing Sheets

FIG. 13

| INPUT VALUE | γ VALUE / OUTPUT VALUE AFTER GAMMA CORRECTION | |
| --- | --- | --- |
| | γ = 1.8 | γ = 2.2 |
| 0 | 0 | 0 |
| 1 | 12 | 21 |
| 2 | 17 | 28 |
| 3 | 22 | 34 |
| 4 | 25 | 39 |
| 5 | 29 | 43 |
| 6 | 32 | 46 |
| 7 | 35 | 50 |
| 8 | 37 | 53 |
| 9 | 40 | 56 |
| 10 | 42 | 59 |
| ⋮ | ⋮ | ⋮ |
| 250 | 252 | 253 |
| 251 | 253 | 253 |
| 252 | 253 | 254 |
| 253 | 254 | 254 |
| 254 | 254 | 255 |
| 255 | 255 | 255 |

PRINT PREVIEW AND SETTING BACKGROUND COLOR IN ACCORDANCE WITH A GAMMA VALUE, COLOR TEMPERATURE AND ILLUMINATION TYPES

BACKGROUND OF THE INVENTION

The present invention relates to an image processing method and apparatus for displaying a visible image.

In recent years, many image processing apparatuses that can display digital images on display devices have been proposed. For example, a copying machine with a preview function, a personal computer with a scanner, and the like have been proposed. In apparatuses of this type, a color image immediately before hard copy output can be displayed on a display device as a preview image.

In order to make the color tone of the preview image match that of the original image, the monitor characteristics (gamma characteristics, color reproduction characteristics, color temperature) must be detected. Also, as one problem associated with the visual sense characteristics, the color perceived changes when illumination light changes (color adaptation). For this reason, the type of illumination light must be detected. For this purpose, the color temperature and type of a monitor, the type of a fluorescent lamp used in illumination, or the like, and the image density (the gamma value of the monitor) can be selected from a console, so as to adjust the color tone of the preview image displayed on the monitor to become closest to that of the original image.

The visual sense of a human being is strongly influenced by the background colors. For example, as is well known, when two identical colors are placed on different background colors upon observation, they are recognized as different colors. However, the prior art does not consider any such visual sense characteristics of a human being associated with the background colors, and simply displays a preview image on a full display range of the display device. For this reason, it is hard to make the color tone of the preview image perfectly match that of the original image. For example, when white as the background color of an original read using a scanner is displayed using a color adaptation predictive method, the background of the original appears tinged with yellow.

On the other hand, using a 4 (rows)×8 (columns) masking/UCR matrix, masking processing and undercolor removal processing normally include a nonlinear calculation, which is described as:

$$\begin{pmatrix} C1 \\ M1 \\ Y1 \\ K1 \end{pmatrix} = \begin{pmatrix} a11 & a12 & a13 & a14 & a15 & a16 & a17 & a18 \\ a21 & a22 & a23 & a24 & a25 & a26 & a27 & a28 \\ a31 & a32 & a33 & a34 & a35 & a36 & a37 & a38 \\ a41 & a42 & a43 & a44 & a45 & a46 & a47 & a48 \end{pmatrix} \begin{pmatrix} C0 \\ M0 \\ Y0 \\ K0 \\ K0 \cdot K0 \\ C0 \cdot M0 \\ M0 \cdot Y0 \\ Y0 \cdot C0 \end{pmatrix} \quad (1)$$

Upon displaying a preview image, an inverse calculation (inverse masking processing) of such nonlinear calculation must be done. In such nonlinear calculation, it is normally impossible to analytically obtain its inverse conversion. In addition, high-order nonlinear terms are generated by overflow or underflow that occurs since data are limited to a range from 0 to 25, in addition to second-order nonlinear terms of the masking/UCR matrix in the masking processing, thus making the calculation of the inverse conversion harder. For this reason, conventionally, the calculation coefficients of the inverse masking processing are obtained by calculating a 4 (rows)×4 (columns) masking/UCR matrix and calculating its inverse matrix in addition to the masking/UCR matrix actually used in the masking processing and undercolor removal processing.

However, the 4×4 masking/UCR matrix suffers larger conversion errors (color differences) than the 4×8 masking/UCR matrix, and with the prior art that obtains an inverse masking matrix using the 4×4 masking/UCR matrix, the color tone of the preview image appears different from that of the original image depending on the types of colors to be displayed.

Furthermore, the gamma characteristics of a display device normally have a nonlinear relationship between the input and output luminances. To correct such nonlinearity, gamma correction is done. However, when the nonlinearity of the display device is strong, the gamma correction results in discrete data, and the gradation characteristics of the image are lost. As a result, pseudo edges are likely to be generated.

SUMMARY OF THE INVENTION

The present invention has been made in consideration of the above-mentioned problems and has as its object to provide an image processing method and apparatus, which display a background for a display image, and allow the user to freely set the background color so as to satisfactorily reproduce the color tone of the display image.

It is another object of the present invention to provide an image processing method and apparatus, which can automatically and appropriately set the background color of a display image on the basis of the display condition of the display image and illumination light, and can appropriately reproduce, especially, the color tone of a preview image.

It is still another object of the present invention to provide an image processing method and apparatus, which can appropriately reproduce the color tone of a preview image by adjusting the background color of a display image to the color of a frame of a display device that is to display the display image.

It is still another object of the present invention to provide an image processing method and apparatus, which can reduce conversion errors in inverse masking processing, and can improve the color reproducibility of a preview image.

It is still another object of the present invention to provide an image processing method and apparatus, which optimize conversion coefficients by obtaining a color difference before and after inverse masking processing using a plurality of color data prepared in advance, and determining the conversion coefficient to minimize the color difference, thereby reducing conversion errors in the inverse masking processing.

It is still another object of the present invention to provide an image processing method and apparatus, which can prevent data from becoming discrete due to gamma correction, and can prevent deterioration of image quality.

In order to achieve the above objects, according to one aspect of the present invention, there is provided an image processing method for generating image data representing a display image on the basis of input image data, comprising: the input step of inputting a display condition for the display image and information associated with illumination light;

the setting step of automatically setting a background color on the basis of the display condition for the display image and the information associated with illumination light input in the input step; and the display step of displaying the background color set in the setting step as a background of the display image.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 13 shows an example of a look-up table for gamma correction processing;

DETAILED DESCRIPTION OF THE PREFERRED EMBODIMENTS

Preferred embodiments of the present invention will now be described in detail in accordance with the accompanying drawings.

[First Embodiment]

Figure 1:
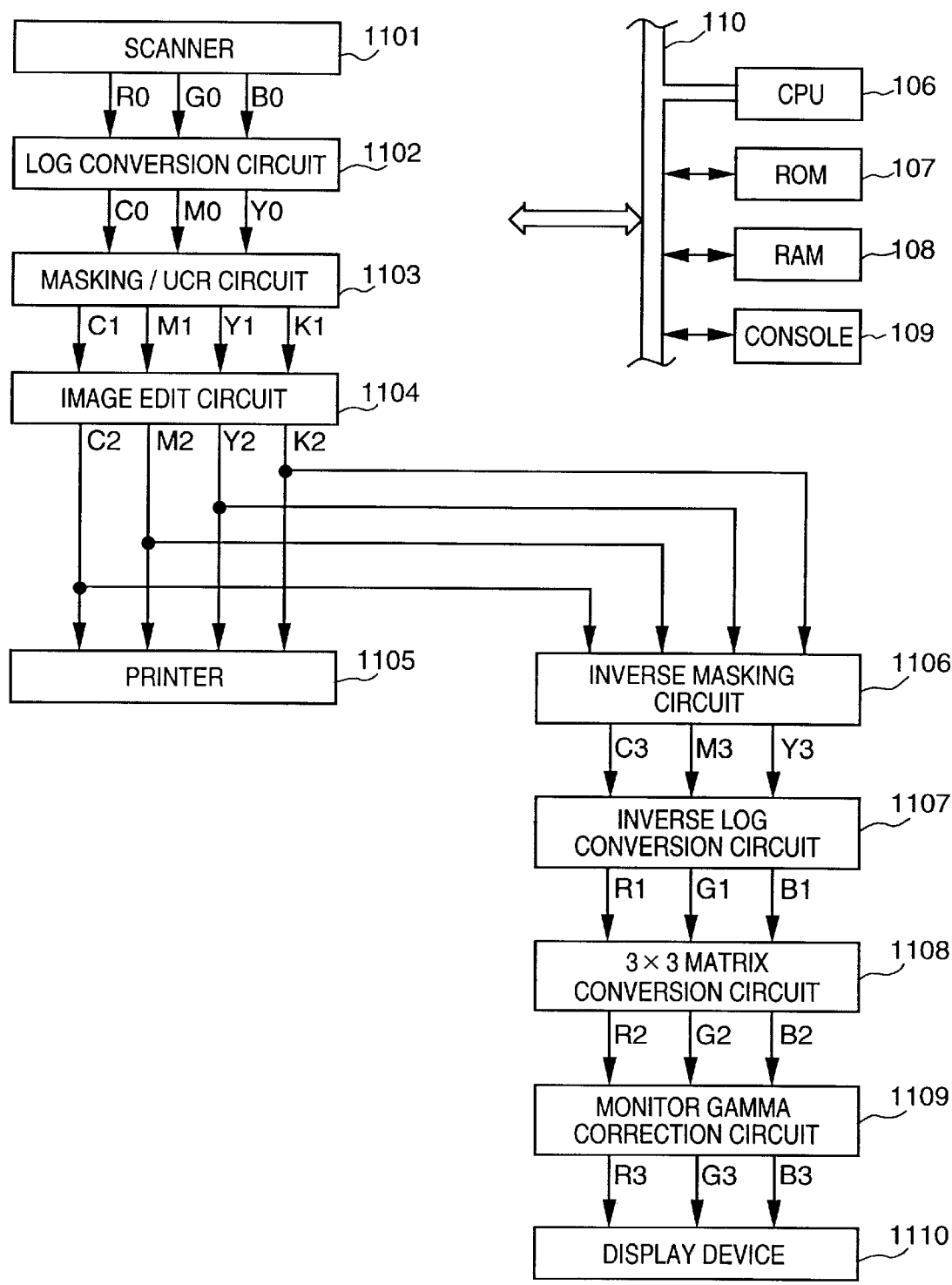
FIG. 1 is a block diagram showing the arrangement of an image processing apparatus according to the first embodiment of the present invention.

FIG. 1 is a block diagram showing the arrangement of an image processing apparatus of the first embodiment. Referring to FIG. 1, blocks 1101 to 1105 make-up a full-color copying machine, blocks 1106 to 1110 make up a preview function, and block 106 to 109 make up a control unit.

Reference numeral 1101 denotes a scanner which digitally reads a reflection original (not shown) in units of pixels to obtain R, G, and B (red, green, and blue) signals. Reference numeral 1102 denotes a log conversion circuit for converting R, G, and B luminance signals into C, M and Y (cyan, magenta, and yellow) density signals; 1103, a masking/UCR (Undercolor Removal) circuit for adjusting colors in accordance with the characteristics of a printer; and 1104, an image edit circuit for performing various kinds of image edit processing such as trimming, painting, variable magnification, and the like. Reference numeral 1105 denotes a printer for outputting a full-color image as a hard copy by controlling the densities of C, M, Y, and K (black) toners or inks by a laser exposure method or ink-jet method.

Reference numeral 1106 denotes an inverse masking circuit that implements inverse conversion of the masking/UCR circuit 1103. Reference numeral 1107 denotes an inverse log conversion circuit for inversely converting C, M, and Y density signals into R, G, and B luminance signals. Reference numeral 1108 denotes a 3×3 matrix conversion circuit for adjusting the color tones of R, G, and B image signals. Reference numeral 1109 denotes a monitor gamma correction circuit for performing gamma correction to correct any nonlinearity of a display device. Reference numeral 1110 denotes a display device.

Reference numeral 106 denotes a CPU for controlling the entire image forming apparatus. Reference numeral 107 denotes a ROM that stores various control programs executed by the CPU 106. Reference numeral 108 denotes a RAM which provides a work area used when the CPU 106 executes various kinds of control. Reference numeral 109 denotes a console at which an operator inputs various instructions. Reference numeral 110 denotes a data bus for connecting the above-mentioned components.

The operation of this apparatus will be briefly described below. In FIG. 1, the blocks of the full-color copying machine will be explained first. A color reflection original on a platen (not shown) is read by the scanner 1101 to generate 8-bit three-color, R, G, and B, digital signals. These color-separated data are converted from R, G, and B luminance signals into C, M, and Y density signals by the log conversion circuit 1102 comprising an LUT (Look up Table). The masking/UCR circuit 1103 generates C, M, Y, and K signals suitable for the printer characteristics. When other image processing is to be done, the image edit circuit 1104 performs desired image processing (trimming, painting, variable magnification, and the like) of the signals. Thereafter, the obtained C, M, Y, and K signals are supplied to a laser exposure device (not shown) or the ink-jet printer 1105 to output a hard copy by controlling the densities of cyan, magenta, yellow, and black toners or inks.

On the other hand, in a preview processor, the C, M, Y, and K image signals immediately before hard copy output are converted into C, M, and Y signals by the inverse masking circuit 1106, and the C, M, and Y signals are inversely converted into R, G, and B signals by the inverse log conversion circuit 1107. Note that the R, G, and B signals obtained by the circuit 1107 depend on the spectral characteristics of R, G, and B color-separation filters of the scanner, and even when these signals are output to the display device, an original image cannot be normally reproduced under the influence of the color reproduction characteristics and nonlinearity of the display device. For this reason, the color reproducibility is improved by the predetermined 3×3 matrix circuit 1108 in consideration of the color-separation characteristics of the scanner and the color reproduction characteristics of the display device, and any nonlinearity of the display device is corrected by the gamma correction circuit 1109. Thereafter, the corrected signals are output to the display device 1110.

Figure 2:
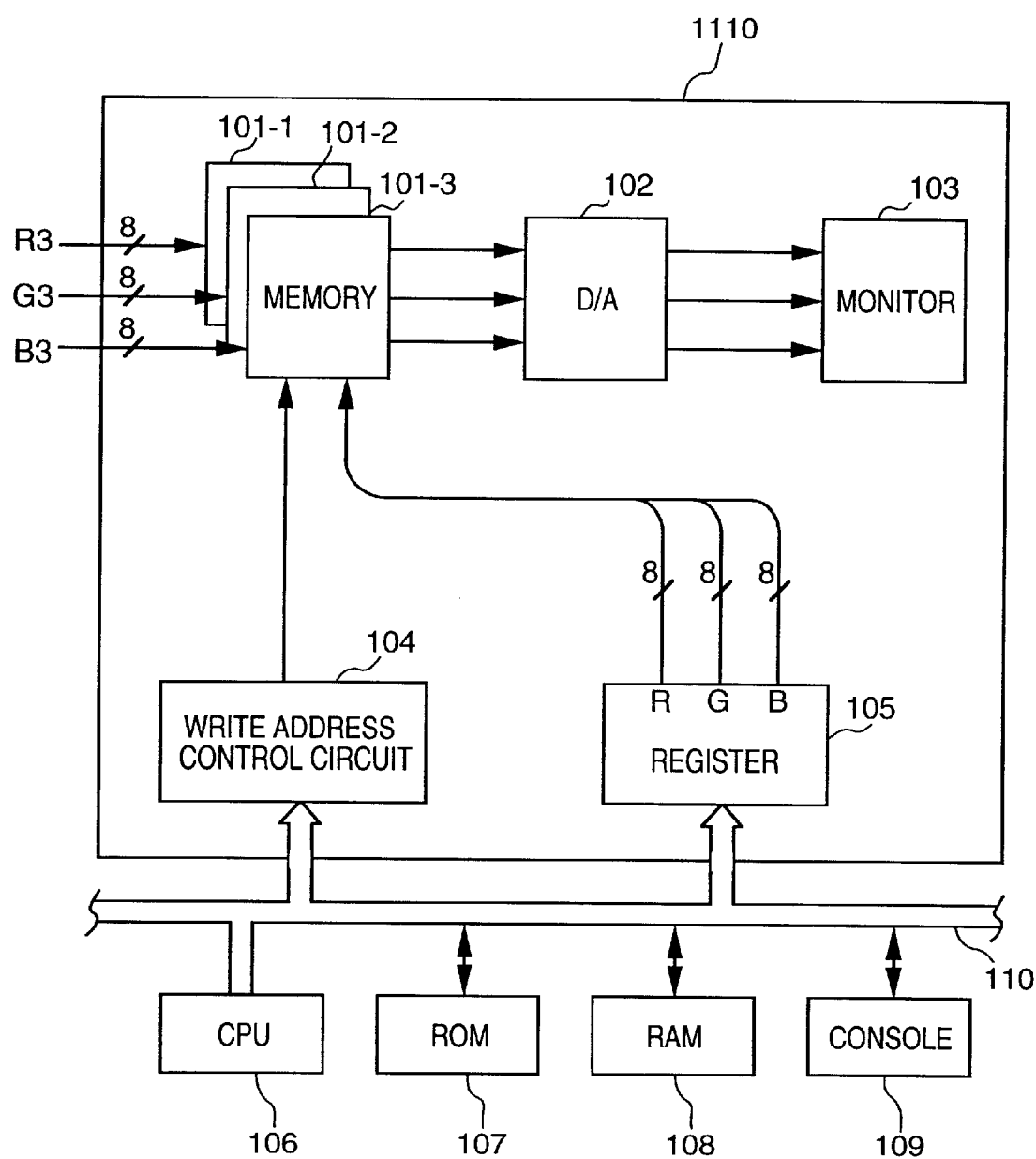
FIG. 2 is a block diagram showing the arrangement of the image processing apparatus according to the first embodiment of the present invention.

FIG. 2 is a block diagram showing the display device 110 of the image processing apparatus of the first embodiment in detail. Reference numerals 101-1, 101-2, and 101-3 denote memories, which temporarily store image data (R3, G3, and B3) obtained after the processing of the monitor gamma correction circuit 1109. Reference numeral 102 denotes a D/A converter for converting digital signals into analog signals; and 103, a monitor for displaying an image. Reference numeral 104 denotes a write address control circuit, which controls the write addresses of input image data on the memories. Reference numeral 105 denotes a register for holding the R, G, and B values of the background color.

Note that the size of an image that can be displayed on the monitor 103 is determined in advance in correspondence with the type of monitor. For example, a VGA monitor popularly used in a personal computer can display an image in 640×480 dots. However, a high-performance monitor used in, e.g., a workstation can display an image in a size several times that of the VGA monitor. In this embodiment, the VGA monitor will be exemplified.

In FIG. 2, 8-bit R, G, and B image data after the gamma correction are respectively stored in the memories 101-1 to 101-3 in units of colors. The size of each of the memories 101-1 to 101-3 is 640×480×8 bits.

Figure 3:
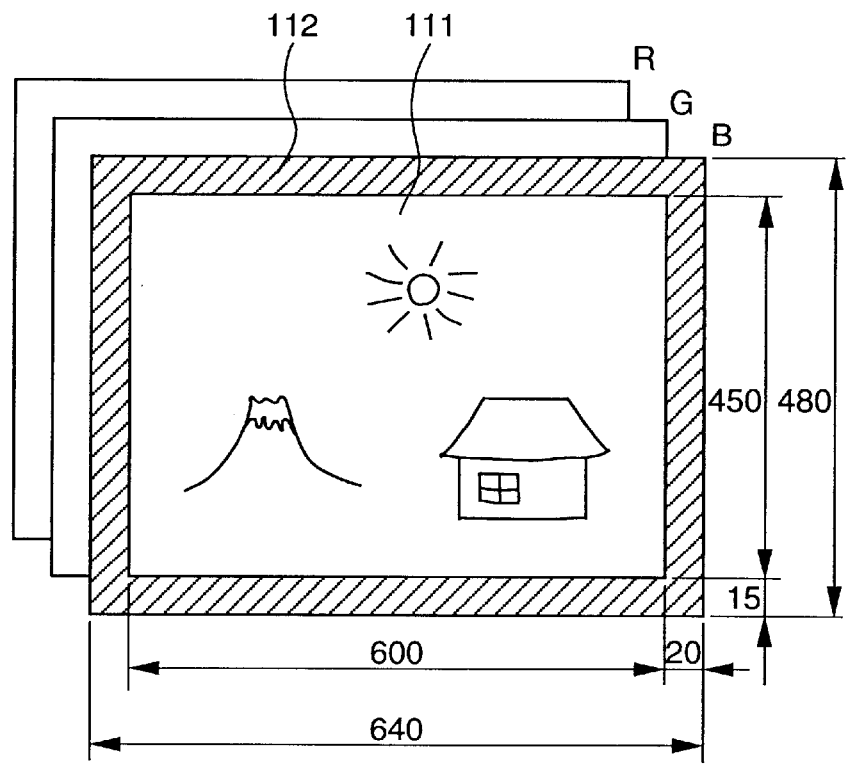
FIG. 3 is a view for explaining image data stored in a memory.

FIG. 3 is a view for explaining image data to be stored in the memories. When image data are stored in the memories 101-1 to 101-3, the size of an image 111 to be displayed is set at 600×450 dots to preserve the aspect ratio of the image. The read R, G, and B image data are stored on the memories 101-1 to 101-3 so that a blank region 112 (20 dots on the right and left sides; 15 dots on the upper and lower sides) is formed around the image 111. In this case, address control is done by the write address control circuit 104. The register 105 holds the R, G, and B values of the background color, which is input in advance from the console 109, and writes these values on the blank region 112 on the memories under the control of the write address control circuit 104. The digital image data stored on the memories are converted into analog signals by the D/A converter 102, and these analog signals are displayed on the monitor 103.

Figure 4:
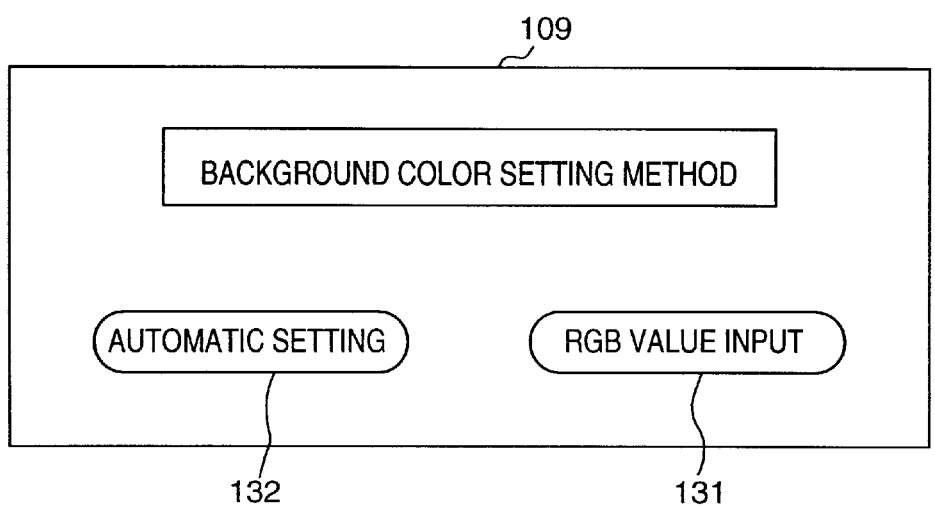
FIG. 4 shows a display example of a background color setting method selection menu on a console 109.
Figure 5:
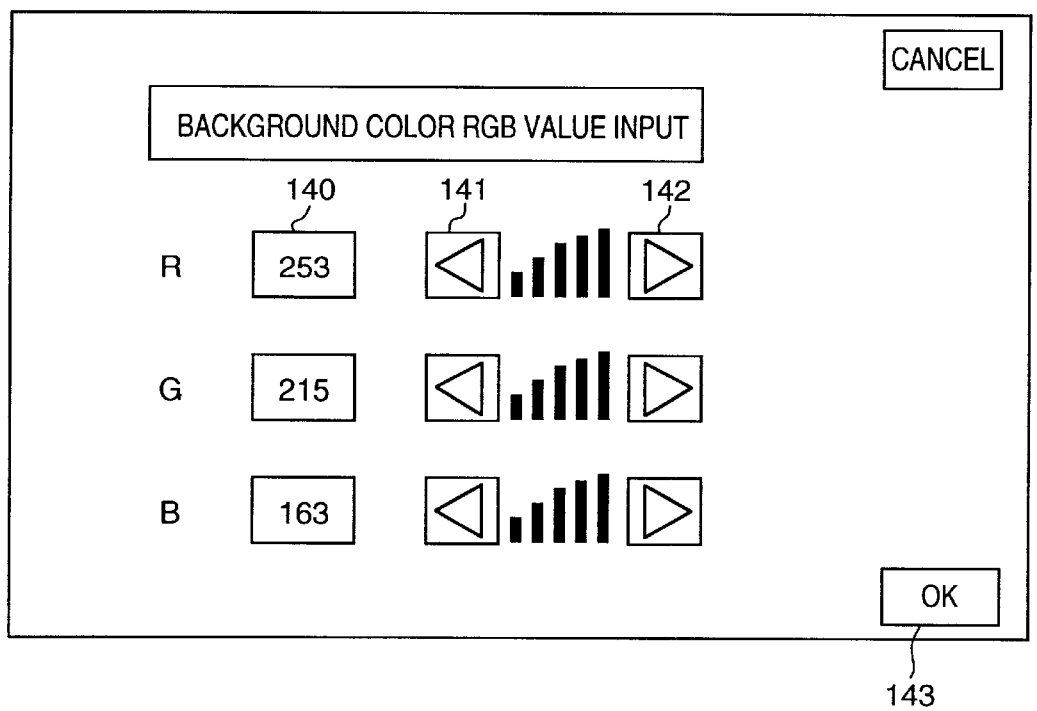
FIG. 5 shows a display example of a control window for setting the R, G, and B values of the background color.
Figure 6:
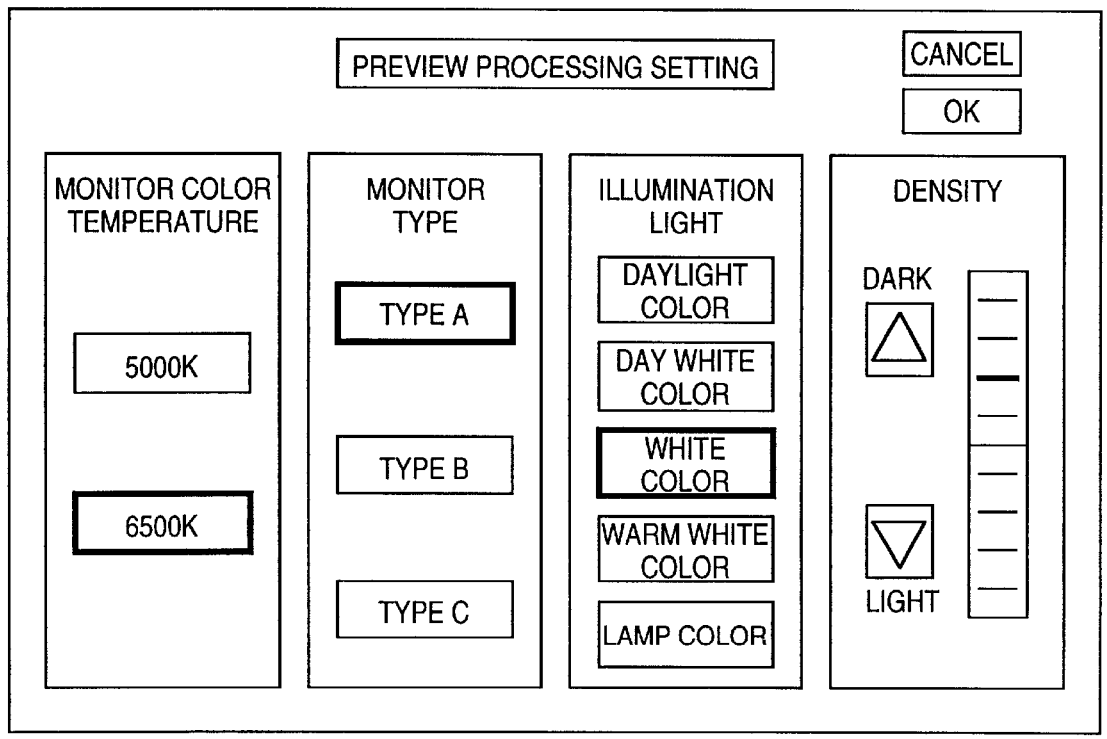
FIG. 6 shows a display example of a control window for setting display conditions of a preview window.

The method of setting the background color will be explained below. FIG. 4 shows a display example of a background color setting method selection menu on the console 109. FIG. 5 shows a display example of a control window for setting the R, G, and B values of the background color. FIG. 6 shows a display example of a control window for setting the display conditions of a preview window.

On the console 109, a window for selecting the background color setting method is displayed, as shown in FIG. 4. When an RGB value input button 131 is selected on this window, the console 109 displays a window that allows the user to independently input the R, G, and B values of the background color, as shown in FIG. 5. On this control window, the user inputs desired numerical values in boxes 140 or sets the individual color component values at desired values by operating numerical value decrement buttons 141 and numerical value increment buttons 142. The set R, G, and B values are held in the register 105. In this manner, as the color tone of the background color can be adjusted by inputting arbitrary R, G, and B values, the color tone of a preview image can be matched with that of an original image with high precision. Note that a region for displaying a color defined by the set R, G, and B values may be assured within the window shown in FIG. 5.

On the other hand, when an automatic setting button 132 is selected on the window shown in FIG. 4, the R, G, and B values of the background color are automatically determined in accordance with pre-set display conditions (the color temperature and type of the designated monitor, the density (gamma value), and the type of illumination light (type of a fluorescent lamp or the like)) of a preview window.

The sequence for automatically setting the R, G, and B values is as follows. As for the types of illumination light displayed on the setting window shown in FIG. 6, tristimulus values obtained by measuring a white paper sheet placed under the corresponding illuminations are stored in, e.g., the ROM 107. Tristimulus values (X, Y, Z) corresponding to the type of illumination light selected on the setting window in FIG. 6 are read out from the ROM 107, and a 3 (rows)×3 (columns) matrix corresponding to the type and color temperature of the monitor selected on the setting window is also read out from the ROM 107, thus converting the X, Y, and Z values into monitor R, G, and B values by calculating:

$$\begin{pmatrix} R \\ G \\ B \end{pmatrix} = \begin{pmatrix} a11 & a12 & a13 \\ a21 & a22 & a23 \\ a31 & a32 & a33 \end{pmatrix} \begin{pmatrix} X \\ Y \\ Z \end{pmatrix} \quad (2)$$

In order to compensate for any nonlinearity of the monitor, the obtained R, G, and B values are subjected to a gamma correction calculation:

$$\begin{aligned} R' &= 255 \times \left( \frac{(R - Roffset)}{255} \right)^{\frac{1}{\gamma}} \\ G' &= 255 \times \left( \frac{(G - Goffset)}{255} \right)^{\frac{1}{\gamma}} \\ B' &= 255 \times \left( \frac{(B - Boffset)}{255} \right)^{\frac{1}{\gamma}} \end{aligned} \quad (3)$$

where Roffset, Goffset, and Boffset are respectively R, G, and B offset components (light emission amounts when the luminance setting value is zero or components of illumination light reflected by the monitor and entering the eyes). Also, a gamma value is uniquely obtained based on the density value selected in advance on the setting window in FIG. 6.

The R, G, and B values obtained in the above-mentioned sequence are held in the register 105 shown in FIG. 1. When image data are written on the memories 101-1 to 101-3, these R, G, and B values are written in the blank region of the image on the memories, thus preview-displaying the background color.

Figure 7:
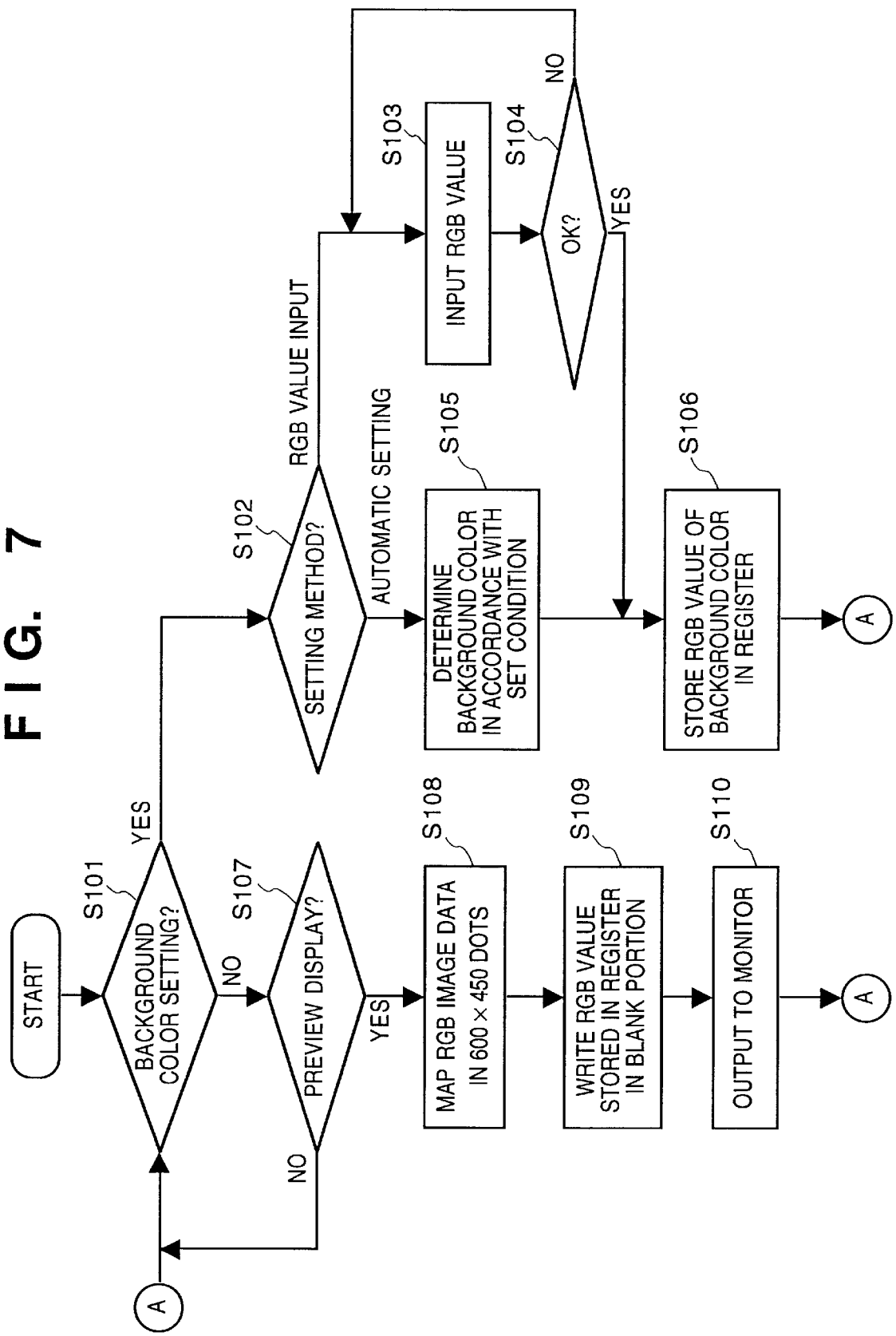
FIG. 7 is a flow chart for explaining the control sequence associated with preview display of the first embodiment.

FIG. 7 is a flow chart for explaining the control sequence associated with preview display of the first embodiment. In step S101, it is checked if a background color setting instruction is input via the console 109. If YES in step S101, the flow advances to step S102 to check if the selected background color setting method is "RGB value input" or "automatic setting". If "RGB value input" is selected by the RGB value input button 131, the flow advances to step S103 to display the RGB value input window for the background color shown in FIG. 5. If an OK button 143 is clicked after desired R, G, and B values are set, the flow advances from step S104 to step S106.

On the other hand, if it is determined in step S102 that the automatic setting button 132 is clicked, the flow advances to step S105. In step S105, the R, G, and B values are calculated on the basis of the conditions (the color temperature and type of the monitor, the type of illumination light, and density) set using the preview processing setting window shown in FIG. 6, and the tristimulus values obtained by measuring a white paper sheet placed under the individual types of illumination light. The flow then advances to step S106.

In step S106, the R, G, and B values set in step S103 or S105 are stored in the register 105, thus ending the background color setting processing.

If execution of preview display is instructed at the console 109, the flow advances from step S107 to step S108, and R, G, and B image data are mapped onto the memories 101-1 to 101-3 (image 111) to have a size of 600×450 dots. In step S109, the R, G, and B values stored in the register 105 are written in the blank regions 112 on the memories 101-1 to 101-3. In this manner, an image is displayed on the monitor 103 on the basis of the data written in the memories 101-1 to 101-3.

Conventionally, for example, when the color temperature of the monitor is 6,500 K, and the type of illumination light is a white fluorescent lamp, if the white background of the read original image is converted by a color adaptation predictive method and is displayed, it is slightly tinged with yellow. However, according to the first embodiment, since the background color further tinged with yellow is displayed, the user can observe the white background in its true color, and the color tone of the preview image can be adjusted to match that of the original image with high precision.

Note that the present invention is not limited to the above embodiment. For example, the background size may be freely changed. On the other hand, the size of each memory may be increased to hold image data several times the monitor screen size, so that image data is normally decimated and displayed at an equal magnification and is displayed in an enlarged scale as needed, thus providing another function.

[Second Embodiment]

When the user observes the monitor, he or she also sees a frame portion, which has a considerably large area and, hence, the human eyes are also adapted to the frame color. The second embodiment realizes satisfactory color matching by setting the color of the above-mentioned blank portion of an image to be equal to that of the frame.

Figure 8:
FIG. 8 shows a display example of a chromaticity value input window for a frame according to the second embodiment of the present invention.

FIG. 8 shows a display example of a chromaticity value input window for a frame according to the second embodiment. Although the arrangement of the second embodiment is the same as that of the first embodiment, the console 109 shown in FIG. 2 displays a window for inputting the chromaticity value of the frame, as shown in FIG. 8. The chromaticity value uses Y, x, and y values including a luminance Y and chromaticity coordinates (x, y) of the CIE1931 calorimetric system (XYZ colorimetric system). The chromaticity value of the frame may use a calorimeter, or the closest color may be searched in a color chart, and the corresponding chromaticity value may be input. In this case, the luminance Y may be set at a visually appropriate value.

The input Y, x, and y values are converted into R, G, and B values by a pre-set matrix calculation and a gamma correction calculation. That is, by definition, the Y, x, and y values can be converted into X, Y, and Z values by:

$$X = x \cdot \frac{Y}{y} \\ Z = \frac{(1-x-y) \cdot Y}{y}$$ (4)

These X, Y, and Z values are converted into monitor R, G, and B values by a 3 (rows)×3 (columns) matrix calculation such as equation (2) above corresponding to the type and color temperature of the monitor selected on the setting window shown in FIG. 6. Finally, the obtained R, G, and B values are subjected to a gamma correction calculation such as equation (3) so as to compensate for any nonlinearity of the monitor.

The R, G, and B values obtained in the above-mentioned sequence are held in the register 105 as in the first embodiment. When image data are written on the memories 101-1 to 101-3, these R, G, and B values are written in the blank regions 112 of images on the memories. As a consequence, the same background color as the frame color is preview-displayed, and the color tone of the preview image can be adjusted to match that of the original image with high precision.

If an image is displayed on the full screen, the need for using the background may be obviated. However, in practice, the end portions of the monitor suffer large distortions, and image distortion and color misregistration are often produced. Hence, by setting the same background color as the frame color, a preview image free from any distortion and having a color tone that matches well that of the original can be displayed.

Note that the operation sequence of the second embodiment is substantially the same as that in the first embodiment except that "the background color is set to match the color of the frame of the monitor", and its control sequence is apparent from the flow chart in FIG. 7.

As described above, according to the first and second embodiments, since the size of an image to be displayed on the display device is set to be smaller than an image size that can be displayed on the display device to form a blank region around the image, and the color of the blank region can be set at an arbitrary color, the color tone of the preview image can be adjusted to match that of the original image with high precision, and a preview image free from any distortion and color misregistration at the end portions of the display device can be displayed.

[Third Embodiment]

The third embodiment will be described below. In the third embodiment, calculation coefficients used in the inverse masking processing are optimized so as to minimize the sum total of squares of the color differences between density data before masking/UCR processing for a plurality of color patches and density data after the inverse masking processing. Also, the third embodiment is characterized by multiplying density data with weighting coefficients, so that the color differences in the CIE1976 L*a*b* color space or CIE1976 L*u*v* color space are to be optimized. With this arrangement, conversion errors in the inverse masking processing can be reduced as compared to the prior art, thus improving the color reproducibility of the preview image.

Note that the arrangement of the image processing apparatus in the third embodiment is the same as that in the first embodiment (FIGS. 1 and 2) and a detailed description thereof will be omitted. An inverse masking circuit and an inverse log conversion circuit as the characteristic arrangements of the third embodiment will be explained below.

Figure 9:
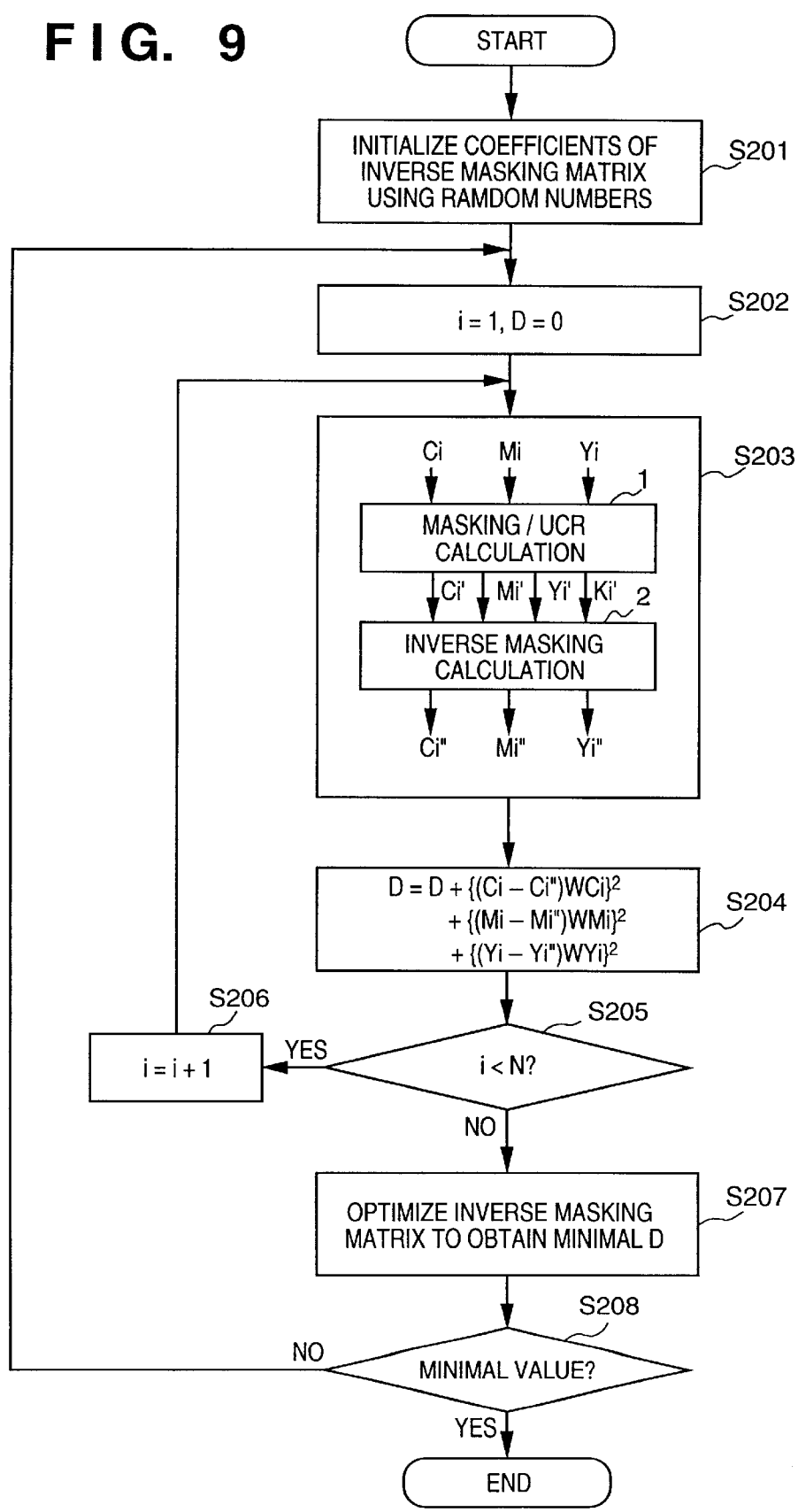
FIG. 9 is a flow chart for explaining the optimization processing of an inverse masking matrix according to the third embodiment of the present invention.

FIG. 9 is a flow chart for explaining the optimization processing of an inverse masking matrix according to the third embodiment. In FIG. 9, reference numeral 1 denotes a masking/UCR calculation for generating C, M, Y, and K color signals suitable for the printer characteristics; and 2, an inverse masking calculation that realizes inverse conversion of calculation 1. This inverse masking calculation 2 is expressed by a matrix calculation:

$$\begin{pmatrix} C'' \\ M'' \\ Y'' \end{pmatrix} = \begin{pmatrix} b11 & b12 & b13 & b14 \\ b21 & b22 & b23 & b24 \\ b31 & b32 & b33 & b34 \end{pmatrix} \begin{pmatrix} C' \\ M' \\ Y' \\ K' \end{pmatrix}$$ (5)

The method of deriving the inverse masking calculation coefficients will be explained below with reference to the flow chart shown in FIG. 9.

In the optimization method, since the obtained solution varies depending on the initial value, the individual coefficients in the inverse masking matrix are initialized by random numbers (step S201). In step S202, a variable i is set at 1, and a variable D is set at 0.

Subsequently, N color patches are prepared, the C, M, and Y values of the i-th color patch are obtained, and these values are subjected to the masking/UCR processing and inverse masking processing (step S203). Let (Ci, Mi, Yi) be the C, M, and Y values of the i-th color patch obtained in step S203, and (Ci", Mi", Yi") be the C, M, and Y values as a result of the masking/UCR processing and inverse masking processing of (Ci, Mi, Yi). In step S204, the sum of the squares of the color differences between (Ci, Mi, Yi) and (Ci", Mi", Yi") is calculated, and is added to the previous value D. In steps S205 and S206, the sum total of squares of the color differences within the range from i=1 to N is obtained. That is, equation (6) below is calculated:

$$D = \sum_{i=1}^{N} \{(Ci'' - Ci)^2 \times WCi^2 + (Mi'' - Mi)^2 \times WMi^2 + (Yi'' - Yi)^2 \times WMi^2\} \quad (6)$$

Upon completion of the calculation of equation (6), the flow advances to step S207 to optimize the inverse masking matrix so as to minimize D. When D does not reach the minimal value by a single calculation, steps S202 to S206 above are repeated until D reaches the minimal value (step S208). Note that the optimization method may use a known method such as a steepest descent method, conjugate gradient method (e.g., a Fletcher-Powell method), and the like.

With the above-mentioned sequence, the inverse masking calculation coefficients are obtained, but the minimal value of D is not always the minimum value of D. In order to obtain optimized inverse masking calculation coefficients, the above-mentioned sequence is repeated a plurality of number of times, and inverse masking calculation coefficients that give the smallest D must be selected from the calculation results.

Note that WCi, WMi, and WYi in equation (6) are weighting coefficients for making the color differences to be optimized approach those in the CIE1976 L*a*b* color space (CIELAB color differences), and are the CIELAB color differences obtained by changing the individual components (Ci, Mi, Yi) of the i-th color patch by a unit quantity.

Figure 10:
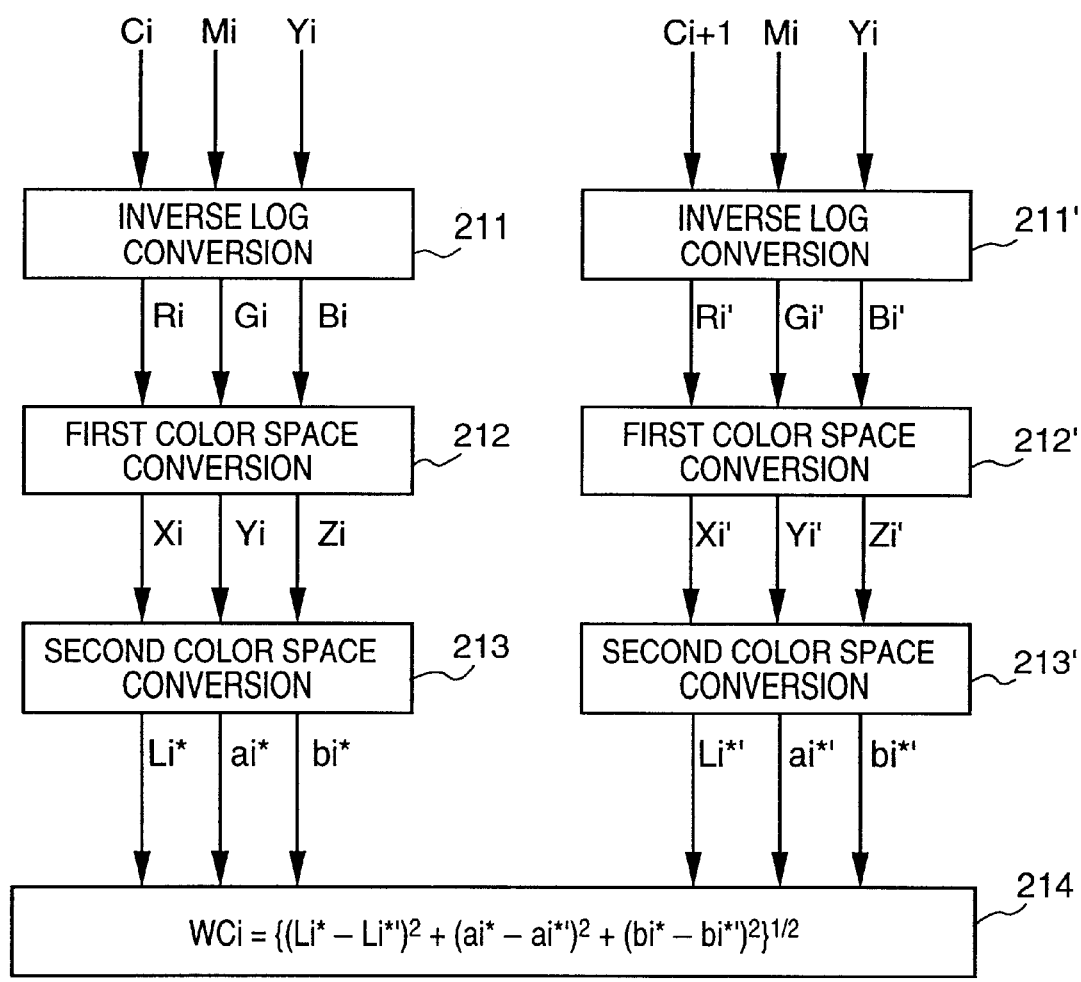
FIG. 10 is a diagram for explaining the acquisition sequence of weighting coefficients in the third embodiment.

The method of obtaining these weighting coefficients will be explained below while taking the weighting coefficient WCi as an example. FIG. 10 is a diagram for explaining the acquisition sequence of the weighting coefficients in the third embodiment. As shown in FIG. 10, the C, M, and Y values (Ci, Mi, Yi) and values (Ci+1, Mi, Yi) obtained by changing the cyan value by a unit quantity are respectively converted into R, G, and B values (Ri, Gi, Bi) and (Ri', Gi', Bi') by inverse log conversion processing blocks 211 and 211'. Subsequently, these R, G, and B values are converted into values in the XYZ colorimetric system by first color space conversion blocks 212 and 212'. The R, G, and B values obtained by the inverse log conversion processing blocks 211 and 211' depend on the color space of the scanner. Therefore, by measuring the characteristics of the scanner in advance, a color space conversion matrix of the first color space conversion block for converting the R, G, and B values into those in the XYZ calorimetric system (CIE1931 colorimetric system) can be obtained as follows:

$$\begin{pmatrix} X \\ Y \\ Z \end{pmatrix} = \begin{pmatrix} c11 & c12 & c13 \\ c21 & c22 & c23 \\ c31 & c32 & c33 \end{pmatrix} \begin{pmatrix} R \\ G \\ B \end{pmatrix} \quad (7)$$

On the other hand, a conversion formula (color space conversion 2) for converting the X, Y, and Z values into L* a* and b* values is known to those who are skilled in the art. Hence, the first color space conversion blocks 212 and 212' respectively convert the R, G, and B values (Ri, Gi, Bi) and (Ri', Gi', Bi') into X, Y, and Z values (Xi, Yi, Zi) and (Xi', Yi', Zi'), and thereafter, second color space conversion blocks 213 and 213' respectively convert the X, Y, and Z values (Xi, Yi, Zi) and (Xi', Yi', Zi') into L*, a*, and b* values (Li*, ai*, bi*) and (Li*', ai*', bi*'), thus calculating WCi according to the following equation:

$$WCi = \{(Li^* - Li^{*'})^2 + (ai^* - ai^{*'})^2 + (bi^* - bi^{*'})^2\}^{1/2} \quad (8)$$

The inverse masking calculation coefficients that are obtained by the above-mentioned method can assure smaller color differences and higher reproducibility, since optimal solutions are directly obtained, than the conventional method that calculates an inverse matrix of a 4 (rows)×4 (columns) masking/UCR matrix obtained in addition to a masking/UCR matrix used in practice. Furthermore, since the optimization calculation must select the minimum value from many minimal values, and requires a partial differential calculation during the optimization process, the calculation time is prolonged unwantedly. In contrast to this, according to the third embodiment, since the weighting coefficients are calculated in advance and the optimization calculation is done on the CMY space, the number of calculations can be greatly reduced as compared to the optimization calculation directly done on the CIELAB space, thus remarkably shortening the calculation time.

Note that the method of preparing color patches is as follows. For example, the output setting values C, M, Y, and K of the printer are changed stepwise to mechanically output all the combinations of colors, or colors such as flesh color, gray scales, and the like that place importance on color reproducibility may be centrally used.

Also, the CIE1976 L*u*v* color space may be used in place of the CIE1976 L*a*b* color space, or another color space may be used.

As described above, according to the third embodiment, since optimal solutions of the inverse masking calculation coefficients are directly obtained using the optimization method, conversion errors of the inverse masking processing can be reduced as compared to the prior art, and the color reproducibility of a preview image can be improved. Also, since the weighting coefficients are calculated in advance so that the optimization calculation of the CIELAB color differences can be done on the CMY space, the calculation time can be greatly shortened.

[Fourth Embodiment]

The fourth embodiment will be described below. In the fourth embodiment, noise components produced by random numbers are superposed on a gamma correction formula for correcting the nonlinearity (gamma characteristics) of a display device so as to randomly distribute discrete data within a predetermined range, thereby preventing pseudo edges from being produced in a preview image.

Figure 11:
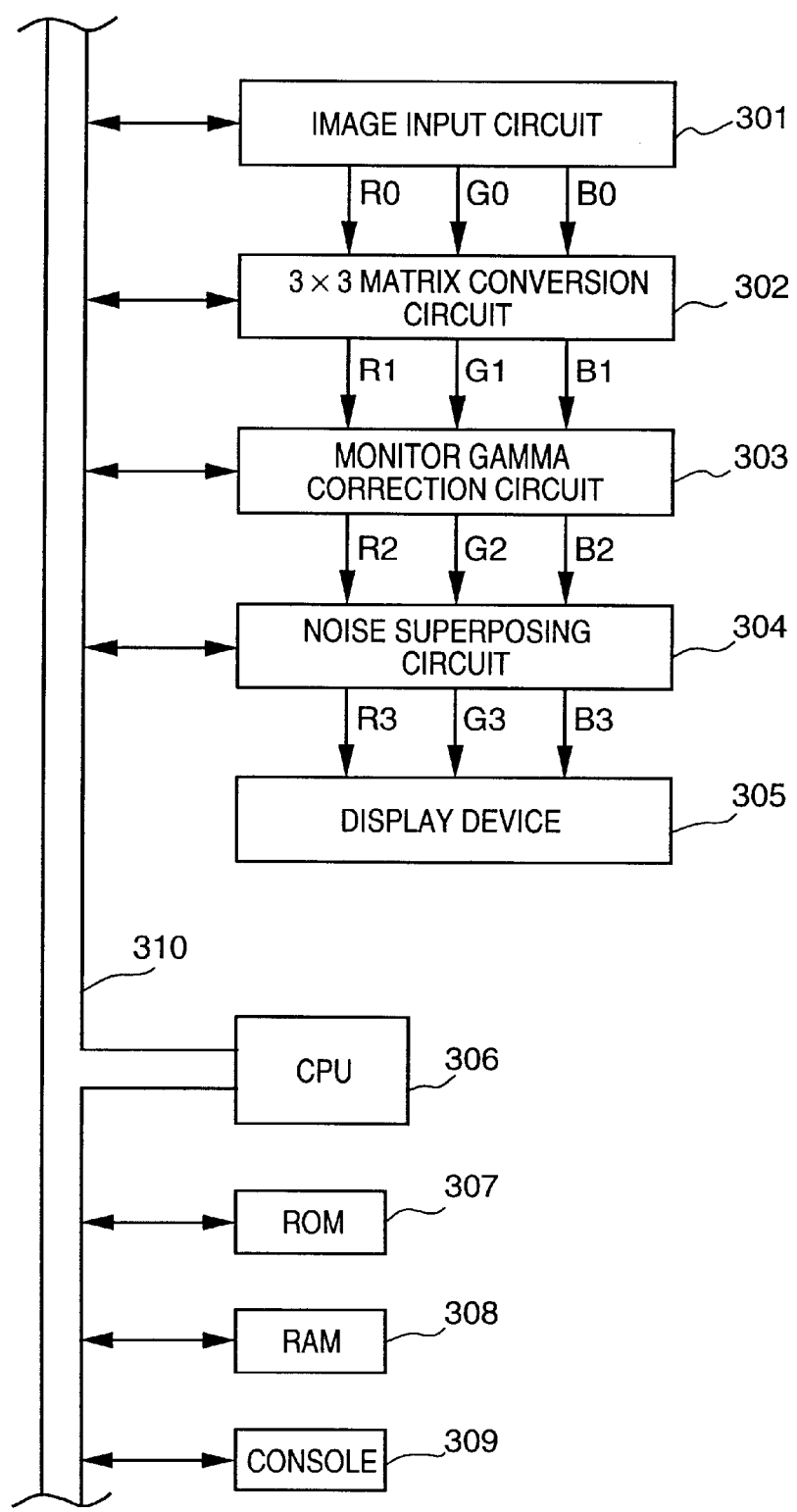
FIG. 11 is a block diagram showing the arrangement of an image processing apparatus according to the fourth embodiment of the present invention.

FIG. 11 is a block diagram showing the arrangement of an image processing apparatus in the fourth embodiment.

Referring to FIG. 11, reference numeral 301 denotes an image input circuit for inputting R, G, and B digital image signals generated by an image reader (not shown). Note that a storage device that stores R, G, and B data may be used in place of the input circuit 301. Reference numeral 302 denotes a 3×3 matrix conversion circuit for adjusting the color tone of an input image signal; 303, a gamma correction circuit for correcting the nonlinearity of a display device; 304, a noise superposing circuit; and 305, a display device. Reference numeral 306 denotes a CPU for controlling the image processing apparatus; 307, a ROM that stores programs; 308, a RAM serving as a work area; 309, a console for inputting an operator's instruction; and 310, a database. The above-mentioned circuits denoted by reference numeral 306 to 310 make up a control unit, and the CPU 306 controls the entire apparatus in accordance with a control program stored in the ROM 307, as will be described below.

Figure 12:
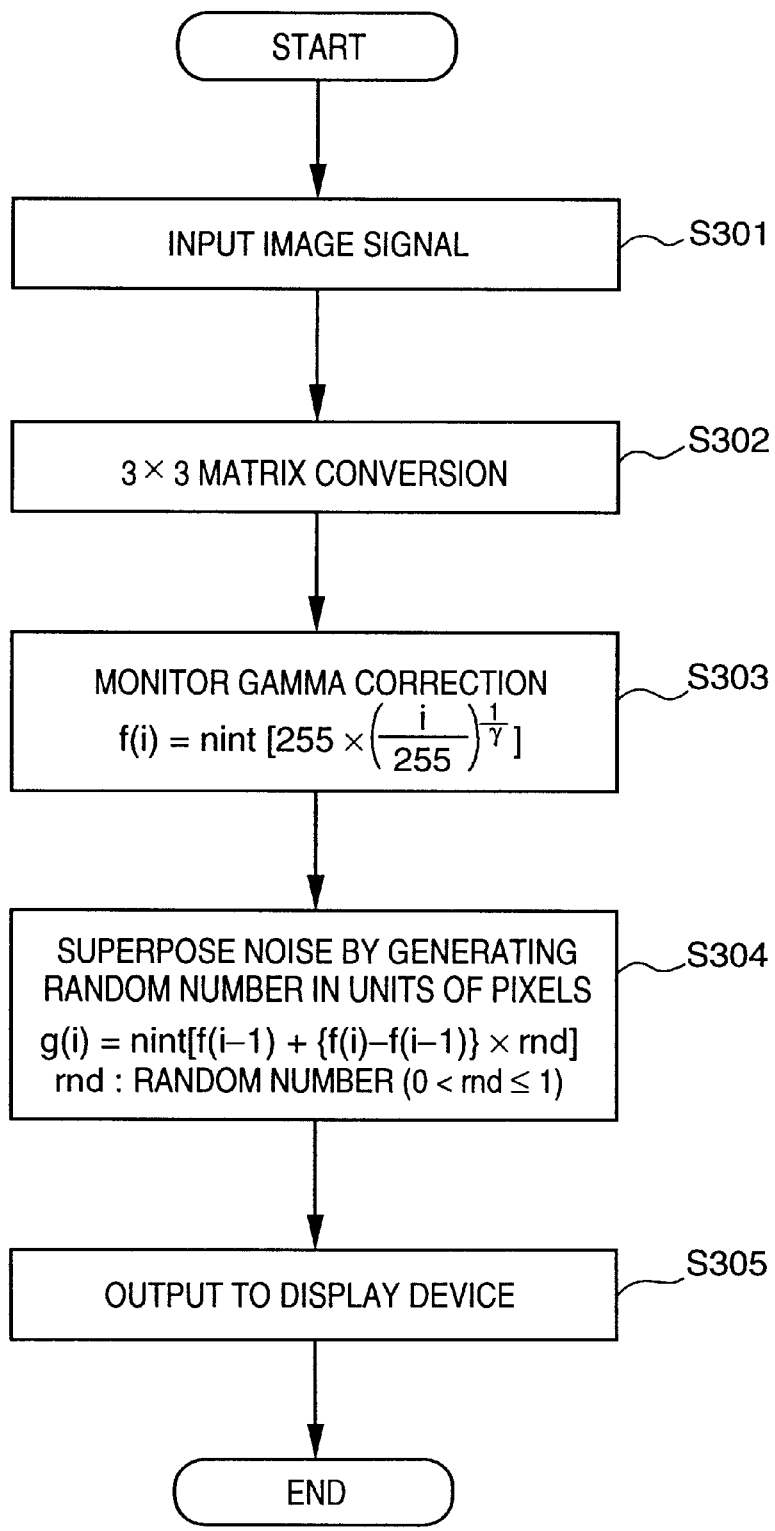
FIG. 12 is a flow chart showing the sequence of image display processing in the fourth embodiment.

FIG. 12 is a flow chart showing the sequence of an image display apparatus in the fourth embodiment. The operation of the image processing apparatus shown in FIG. 11 will be described below with reference to the flow chart shown in FIG. 12.

In FIG. 11, an image read by the image reader (not shown) is captured as 8-bit three-color, R, G, and B, digital signals into the image processing apparatus via the image input circuit 301 (step S301). The input image signals are based on the color space of the image reader, and even when these signals are directly output to the display device, an original image cannot be normally reproduced under the influence of the color reproduction characteristics and nonlinearity (gamma characteristics) of the display device. For this reason, the color tone of the image is adjusted by the 3×3 matrix conversion circuit 302 (step S302). The 3×3 matrix calculation is given by:

$$\begin{pmatrix} R2 \\ G2 \\ B2 \end{pmatrix} = \begin{pmatrix} c11 & c12 & c13 \\ c21 & c22 & c23 \\ c31 & c32 & c33 \end{pmatrix} \begin{pmatrix} R1 \\ G1 \\ B1 \end{pmatrix} \quad (9)$$

Subsequently, the nonlinearity of the display device is corrected by the monitor gamma correction circuit 303 comprising an LUT (step S303). This gamma correction formula is normally:

$$\left. \begin{array}{l} R3 = 255 \times \left(\frac{R2}{255}\right)^{\frac{1}{\gamma}} \\ G3 = 255 \times \left(\frac{G2}{255}\right)^{\frac{1}{\gamma}} \\ B3 = 255 \times \left(\frac{B2}{255}\right)^{\frac{1}{\gamma}} \end{array} \right\} \quad (10)$$

For example, when the display device comprises a CRT monitor, the actually measured value of gamma is distributed within the range from about 1.8 to 2.2, and the LUT used at that time is, as shown in FIG. 13. Hence, when the input value is small, the output value becomes discrete to lose the gradation characteristics, and pseudo edges are likely to be produced at low-luminance portions of an image.

In order to prevent pseudo edges produced as described above, noise is superposed on the gamma correction value to forcibly randomly distribute discrete output values within a predetermined range. For this purpose, in the fourth embodiment, a random number rnd (0<rnd<1) is generated in units of pixels to superpose a noise component on a gamma correction value f(i) for an input value i, thus acquiring an output pixel value g(i). First, the gamma correction value f(i) for the input value i is obtained by the following equation (11) that is provided on the basis of the equation (10):

$$f(i) = n \ \text{int}\left(255 \times \left(\frac{i}{255}\right)^{\frac{1}{\gamma}}\right) \quad (11)$$

Subsequently, the output value g(i) obtained by superposing a noise component on the pixel value f(i) after gamma correction is calculated by an equation below. The following equation randomly assumes a value between f(i−1) and f(i) (step S304).

$$g(i)=n \ \text{int}[f(i-1)+\{f(i)-f(i-1)\}\times rnd] \quad (12)$$

After the noise components are superposed on image data, the image data are output to the display device 305 (step S305). In the above equation, nint[ ] is a function of converting a decimal number into an integer by rounding off. Also, the random number generation method may use a known random number generation algorithm such as a multiplicative congruential method, or a random number table held on the ROM.

With the above-mentioned processing, since gradation characteristics can also be given to low-luminance portions of an image, pseudo edges formed by the gamma correction processing disappear. In addition, in terms of the nature of the gamma characteristics, since noise components are superposed on only low-luminance portions, they cannot be visually perceived. Hence, the image quality never deteriorates.

Note that the present invention is not limited to the above embodiment. For example, the present invention may be applied to a monochrome image made up of a luminance signal. In this case, the image signal to be processed is a luminance signal alone, and the 3×3 matrix conversion circuit 302 is omitted.

In order to shorten the processing time, noise superposing processing may be done only when the input value is small (e.g., i<10 or i<20).

Furthermore, the output value g(i) is not limited to any specific value as long as it is in the neighborhood of f(i), and for example, it may randomly assume a value between f(i−1) and f(i+1) as follows:

$$g(i)=n \ \text{int}[f(i-1)+\{f(i+1)-f(i-1)\}\times rnd] \quad (13)$$

The random numbers may have either a uniform distribution or a nonuniform distribution like a Gaussian distribution.

[Fifth Embodiment]

Figure 14:
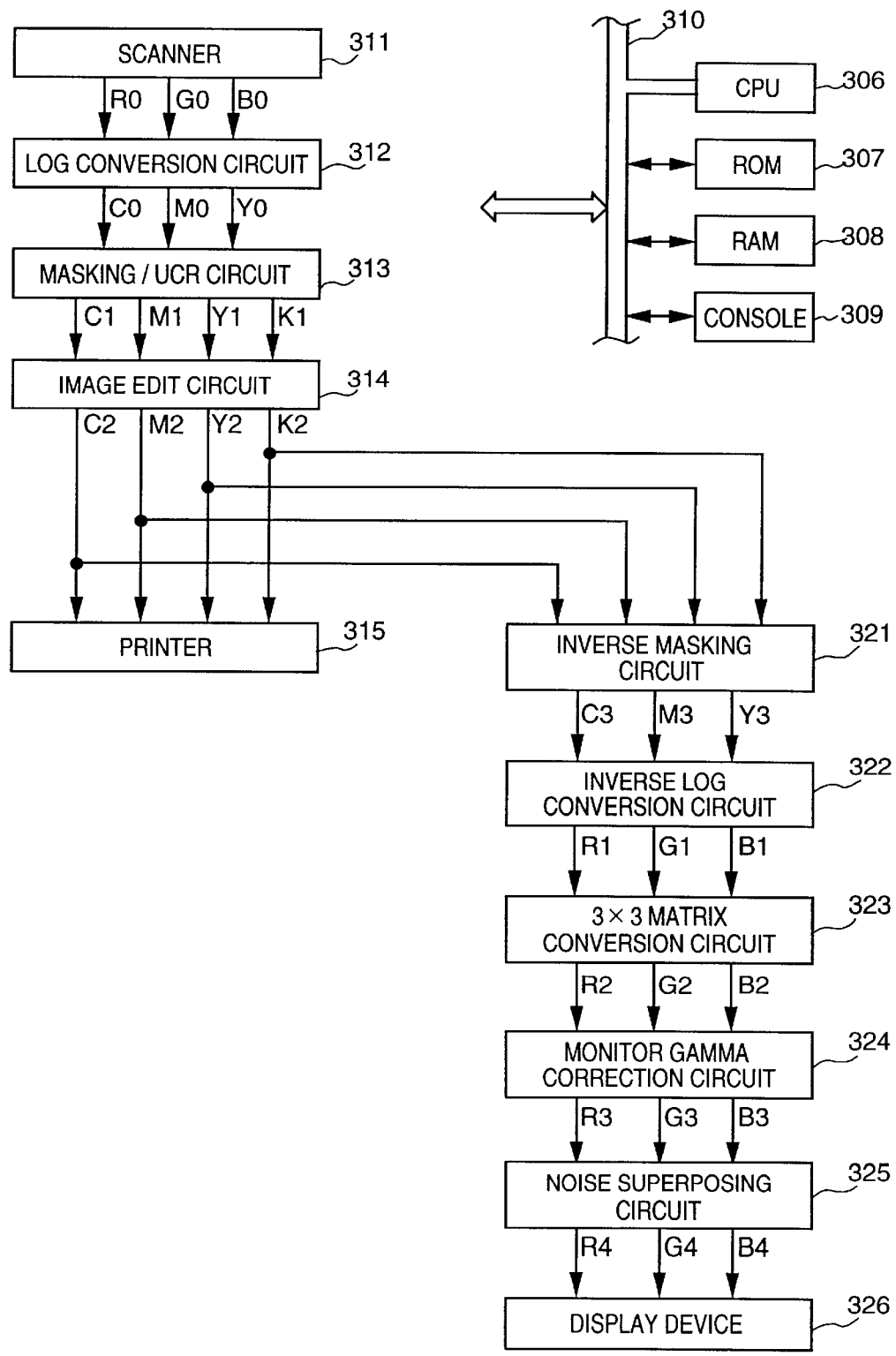
FIG. 14 is a block diagram showing the arrangement of an image processing apparatus according to the fifth embodiment of the present invention.

FIG. 14 is a block diagram showing the arrangement of an image processing apparatus according to the fifth embodiment of the present invention. Blocks 306 to 310 make up a control unit, blocks 311 to 315 make up a full-color copying machine, and blocks 321 to 316 make up a preview function.

In FIG. 14, the blocks 306 to 310 are the same as those in the fourth embodiment, and a detailed description thereof will be omitted.

Reference numeral 311 denotes a scanner which digitally reads a reflection original (not shown) in units of pixels to obtain R, G, and B signals; 312, a log conversion circuit for converting R, G, and B luminance signals into C, M, and Y density signals; 313, a masking/UCR circuit for adjusting colors in accordance with the characteristics of a printer;

314, an image edit circuit for performing various kinds of image edit processing such as trimming, painting, variable magnification, and the like; and 315, a laser exposure type or ink-jet type printer for outputting a full-color image as a hard copy by controlling the densities of cyan, magenta, yellow, and black toners or inks.

Reference numeral 321 denotes an inverse masking circuit that implements inverse conversion of the masking/UCR circuit 313. Reference numeral 322 denotes an inverse log conversion circuit for inversely converting C, M, and Y density signals into R, G, and B luminance signals. Reference numeral 323 denotes a 3×3 matrix conversion circuit for adjusting the color tones of R, G, and B image signals; 324, a gamma correction circuit for correcting any nonlinearity of a display device; 325, a noise superposing circuit; and 326, a display device.

Note that the image edit circuit 314 is illustrated as one block for the sake of simplicity. However, in practice, image processing circuits are arranged at various positions in accordance with the types of various kinds of image processing such as color balance change, color conversion, mask processing, and the like.

The operation of this apparatus will be described below. The blocks of the full-color copying machine in FIG. 14 will be explained below. A color reflection original on a platen (not shown) is read by the scanner 311 to generate 8-bit three-color, R, G, and B, digital signals. These color-separated data are converted from R, G, and B luminance signals into C, M, and Y density signals by the log conversion circuit 312 comprising an LUT. The masking/UCR circuit 313 generates C, M, Y, and K signals suitable for the printer characteristics. Note that this masking/UCR is executed using equation (1) above for K0 given by:

$$K0 = \min(C0, M0, Y0) \quad (14)$$

Thereafter, the image edit circuit 314 executes various kinds of image edit processing of the image such as trimming, painting, variable magnification, and the like in accordance with the user's setting, and thereafter, the printer 315 outputs a hard copy of the image.

On the other hand, in a preview system, four-color, C2, M2, Y2, and K2 density data immediately before the hard copy is output are converted into three-color, C3, M3, and Y3 density data by the inverse masking circuit 321. This inverse masking calculation is given by:

$$\begin{pmatrix} C3 \\ M3 \\ Y3 \end{pmatrix} = \begin{pmatrix} b11 & b12 & b13 & b14 \\ b21 & b22 & b23 & b24 \\ b31 & b32 & b33 & b24 \end{pmatrix} \begin{pmatrix} C2 \\ M2 \\ Y2 \\ K2 \end{pmatrix} \quad (15)$$

Subsequently, the C, M, and Y signals are inversely converted into R, G, and B signals by the inverse log conversion circuit 322. These R, G, and B image signals are based on the color space of the scanner, and even when these signals are directly output to the display device, an original image cannot be normally reproduced under the influence of the color reproduction. characteristics and nonlinearity (gamma characteristics) of the display device. For this reason, the color tone of an image is adjusted by the 3×3 matrix conversion circuit 323. The 3×3 matrix calculation is given by equation (9) above.

The nonlinearity of the display device is corrected by the gamma correction circuit 324 comprising an LUT. This gamma correction formula is normally given by equation (10) above. For example, when the display device comprises a CRT monitor, the actually measured value of gamma is distributed within the range from about 1.8 to 2.2, and an LUT used at that time is prepared, as shown in FIG. 13. Hence, when the input value is small, the output value becomes discrete to lose the gradation characteristics, and pseudo edges are likely to be produced at low-luminance portions of an image.

In order to prevent pseudo edges produced in this manner, as has been described in the fourth embodiment, noise is superposed on the gamma correction value to forcibly randomly distribute discrete output values within a predetermined range. Noise is superposed by the noise superposing circuit 325, but its operation is the same as that of the noise superposing circuit 304 in the fourth embodiment and a detailed description thereof will be omitted.

Figure 15:
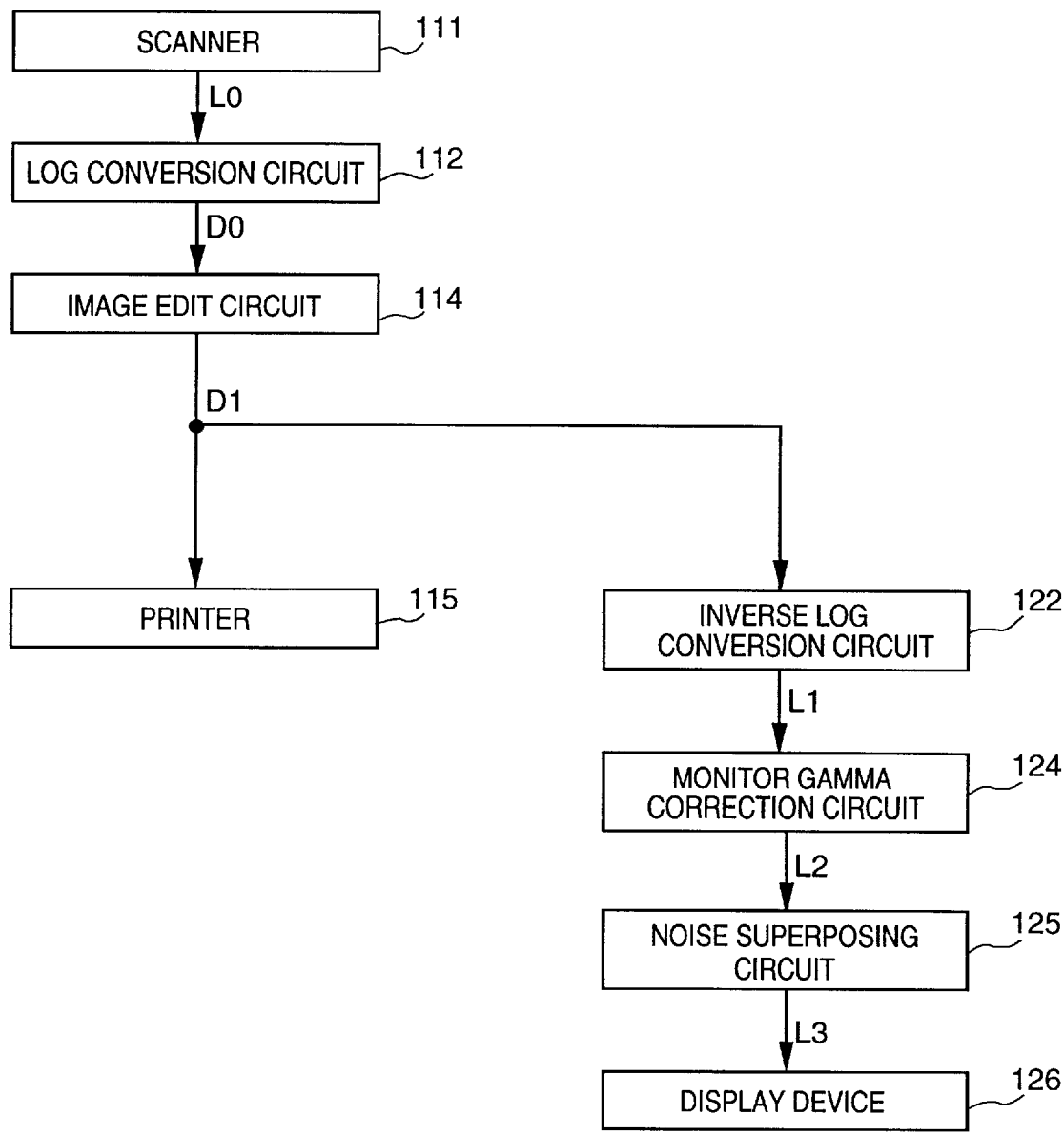
FIG. 15 is a block diagram showing the arrangement used when image processing of the fifth embodiment is applied to a monochrome image processing apparatus.

Note that the present invention is not limited to the above embodiment. For example, the present invention may be applied to a monochrome copying machine. In this case, the image signal to be processed is a luminance signal alone, and the 3×3 matrix conversion circuit 323 is omitted. Also, since the need for the color processing circuit such as the masking/UCR circuit 313 or the like can be obviated, the apparatus has an arrangement, as shown in FIG. 15.

In order to shorten the processing time, noise superposing processing may be done only when the input value is small (e.g., i<10 or i<20).

Furthermore, the output value g(i) is not limited to any specific value as long as it is in the neighborhood of f(i), and for example, it may randomly assume a value between f(i−1) and f(i+1), as given by equation (13) above.

The random numbers may have either a uniform distribution or a nonuniform distribution like a Gaussian distribution.

As described above, according to the fourth and fifth embodiments, since noise components generated by random numbers are superposed on the gamma correction formula for correcting the nonlinearity (gamma characteristics) of the display device, pseudo edges produced on a preview image can be prevented.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Also, the above-mentioned embodiments may be desirably combined. For example, the background color of a preview image may be appropriately set by the first embodiment, the color reproducibility of the preview image may be improved by the third embodiment, and the image quality of the preview image may be improved by the fourth embodiment.

As described above, according to the present invention, the background is displayed for a display image and its background color can be set, thus satisfactorily adjusting the color tone of the display image.

Also, according to the present invention, conversion errors in the inverse masking processing are reduced, thus improving the color reproducibility of a preview image.

Furthermore, according to the present invention, data can be prevented from becoming discrete by the gamma correction, and image deterioration can be avoided.

As many apparently widely different embodiments of the present invention can be made without departing from the spirit and scope thereof, it is to be understood that the invention is not limited to the specific embodiments thereof except as defined in the appended claims.

What is claimed is:

1. An image processing method, comprising the steps of:

inputting information associated with illumination light; and setting a background color of a display on the basis of a mode selected from a plurality of modes by a user, the background color being a color displayed in a display area other than a display area where a user's desired display image is displayed, wherein said plurality of modes include:

an automatic setting mode in which color data is calculated on the basis of a measured color value obtained by measuring a white paper sheet placed under the illumination light, the information associated with the illumination light and color temperature of the display, with the color data being set as the background color; and a manual setting mode in which a color designated by a user is set as the background color.

2. The method according to claim 1, wherein, in the input step, the information associated with the illumination light and a display condition for the display image are input, and the display image is obtained by processing color image data based on the display condition.

3. The method according to claim 2, wherein the color data is obtained by correcting the measured color value on the basis of the color temperature of the display and a gamma value set by a manual instruction.

4. The method according to claim 1, wherein the user's desired display image is a preview image which is displayed on the display for confirming an image to be formed by an image forming apparatus based on original image data of the display image.

5. An image processing method comprising the steps of:

inputting information associated with a color of a frame of a display device; and setting a background color based on the information associated with a color of a frame to be substantially equal to the color of the frame of the display device, wherein the background color of the display is a color displayed in a display area other than a display area where a user's desired display image is displayed.

6. An image processing apparatus, comprising:

input means for inputting information associated with illumination light; and setting means for setting a background color of a display on the basis of a mode selected from a plurality of modes by a user, the background color being a color displayed in a display area other than a display area where a user's desired display image is displayed; and wherein said plurality of modes include:

an automatic setting mode in which color data is calculated on the basis of a measured color value obtained by measuring a white paper sheet placed under the illumination light, the information associated with the illumination light and color temperature of said display, and the color data is set as the background color; and a manual setting mode in which a color designated by a user is set as the background color.

7. A storage medium for storing an image processing program, comprising:

a code for inputting information associated with illumination light; and a code for setting a background color of a display on the basis of a mode selected from a plurality of modes by a user, the background color being a color displayed in a display area other than a display area where a user's desired display image is displayed, wherein said plurality of modes include:

an automatic setting mode in which color data is calculated on the basis of a measured color value obtained by measuring a white paper sheet placed under the illumination light, the information associated with the illumination light and color temperature of the display, and the color data is set as the background color; and a manual setting mode in which a color designated by a user is set as the background color.

* * * * *

UNITED STATES PATENT AND TRADEMARK OFFICE
CERTIFICATE OF CORRECTION

PATENT NO. : 6,343,147 B2  Page 1 of 1
DATED : January 29, 2002
INVENTOR(S) : Nobuo Yamamoto It is certified that error appears in the above-identified patent and that said Letters Patent is hereby corrected as shown below:

Column 2,
Line 8, "prooessing." should read -- processing --.

Column 7,
Line 45, "calorimetric" should read -- colorimetric --.
Line 46, "calorimeter" should read -- colorimeter --.

Column 10,
Line 1, "calorimetric" should read -- colorimetric --.

Column 11,
Line 65, "(0<rnd<1)" should read -- (0<rnd≤1) --.

Column 13,
Line 50, "b24" should read -- b34 --.
Line 59, "reproduction." should read -- reproduction --.

Column 15,
Line 43, "with" should read -- and -- and "being" should read -- is --.

Signed and Sealed this

Eighth Day of October, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO.     : 6,343,147 B2
DATED          : January 29, 2002
INVENTOR(S)    : Nobuo Yamamoto It is certified that error appears in the above-identified patent and that said Letters Patent is hereby corrected as shown below:

<u>Title page,</u>
Item [*] Notice, before the paragraph "Subject to any disclaimer..." insert the following:

-- This patent issued on a continued prosecution application filed under 37 CFR 1.53(d), and is subject to the twenty year patent term provisions of 35 U.S.C. 154(a)(2). --

Signed and Sealed this

Twenty-ninth Day of July, 2003

JAMES E. ROGAN
*Director of the United States Patent and Trademark Office*